US011387959B2

(12) United States Patent
Schelstraete

(10) Patent No.: US 11,387,959 B2
(45) Date of Patent: *Jul. 12, 2022

(54) WIFI ANTENNA SELECTION WITH BEAMFORMING

(71) Applicant: SEMICONDUCTOR COMPONENTS INDUSTRIES, LLC, Phoenix, AZ (US)

(72) Inventor: Sigurd Schelstraete, Menlo Park, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 215 days.

This patent is subject to a terminal disclaimer.

(21) Appl. No.: 16/734,014

(22) Filed: Jan. 3, 2020

(65) Prior Publication Data

US 2020/0145163 A1 May 7, 2020

Related U.S. Application Data

(63) Continuation of application No. 15/462,903, filed on Mar. 19, 2017, now Pat. No. 10,567,134.

(Continued)

(51) Int. Cl.
*H04L 5/00* (2006.01)
*H04B 7/06* (2006.01)
(Continued)

(52) U.S. Cl.
CPC ......... *H04L 5/0051* (2013.01); *H04B 7/0417* (2013.01); *H04B 7/0486* (2013.01);
(Continued)

(58) Field of Classification Search
None
See application file for complete search history.

(56) References Cited

U.S. PATENT DOCUMENTS

| 7,555,053 B2 | 6/2009 | Trachewsky et al. |
| 8,421,676 B2 | 4/2013 | Moshfeghi |

(Continued)

OTHER PUBLICATIONS

T.W. Ban et al.; "A Practical Antenna Selection Technique in Multiuser Massive MIMO Networks"; IEICE Trans. Commun. vol. E96-B, No. 11; Nov. 2013; 5 pages.

(Continued)

*Primary Examiner* — Steve R Young
(74) *Attorney, Agent, or Firm* — Maschoff Brennan

(57) ABSTRACT

A circuit includes a beamform antenna selection circuit coupled to transmit chains. The beamform antenna circuit is to determine a number of possible combinations that the transmit chains may couple to an array of antennas, generate a set of antenna mapping matrices, the number of antenna mapping matrices in the set of antenna mapping matrices being equal to the number of possible combinations, generate, based on the set of antenna mapping matrices, a sounding packet to test the possible combinations, receive sounding feedback, determine a performance for each of the possible combinations based on the sounding feedback, wherein a particular combination has a highest ranked performance; and switchably couple the transmit chain to an antenna of the array of antennas that is associated with the particular combination with the highest ranked performance for transmission of subsequent data communication packets.

25 Claims, 7 Drawing Sheets

Method for MIMO WiFi Transceiver Antenna Selection

Related U.S. Application Data

(60) Provisional application No. 62/460,066, filed on Feb. 16, 2017.

(51) Int. Cl.
  *H04B 7/0456* (2017.01)
  *H04B 7/0417* (2017.01)
  *H04W 72/08* (2009.01)
  *H04W 84/12* (2009.01)

(52) U.S. Cl.
  CPC ......... *H04B 7/0617* (2013.01); *H04B 7/0695* (2013.01); *H04L 5/0023* (2013.01); *H04W 72/085* (2013.01); *H04W 84/12* (2013.01)

(56) References Cited

U.S. PATENT DOCUMENTS

| | | | | |
|---|---|---|---|---|
| 8,428,168 | B1* | 4/2013 | Zhang | H04B 7/061 |
| | | | | 375/267 |
| 2009/0278742 | A1 | 11/2009 | Mehta et al. | |
| 2011/0249576 | A1* | 10/2011 | Chrisikos | H04B 7/0691 |
| | | | | 370/252 |
| 2012/0314649 | A1 | 12/2012 | Forenza et al. | |
| 2014/0093005 | A1 | 4/2014 | Xia et al. | |
| 2015/0085944 | A1* | 3/2015 | Mobasher | H04B 7/0413 |
| | | | | 375/267 |
| 2016/0033614 | A1* | 2/2016 | Wang | G01S 3/043 |
| | | | | 342/378 |
| 2016/0277132 | A1* | 9/2016 | Pratt | H04B 17/373 |
| 2016/0380729 | A1 | 12/2016 | Porat et al. | |
| 2018/0167252 | A1 | 6/2018 | Wang et al. | |
| 2018/0213382 | A1 | 7/2018 | Tabet et al. | |
| 2019/0089504 | A1 | 3/2019 | Hwang et al. | |

OTHER PUBLICATIONS

T.H .Tai et al.; "A Low Complexity Antenna Selection Algorithm for Energy Efficiency in Massive MIMO Systems"; DSDIS, 2015 IEEE; Dec. 11-12, 2015; 6 pages.

G. Xiang et al.; "Antenna Selection in Measured Massive MIMO Channels using Convex Optimization"; IEEE Globecom Workshop, Atlanta, Georgia, USA; 2013; 7 pages.

L. Lu et al.; "An Overview of Massive MIMO: Benefits and Challenges"; IEEE Journal of Selected Topics in Signal Processing; vol. 8, No. 5; Oct. 2014; 17 pages.

X. Gao et al.; "Massive MIMO in Real Propagation Environments: Do all Antennas Contribute Equally"; IEEE Transactions on Communications; Jan. 1, 2015; 13 pages.

X. Gao et al.; "Multi-Switch for Antenna Selection in Massive MIMO"; IEEE Global Communications Conference; Globecom 2015; 6 pages.

United States Patent and Trademark Office; Non-final Office Action dated Nov. 14, 2018 in U.S. Appl. No. 15/462,903; 24 pages.

United States Patent and Trademark Office; Final Office Action dated Feb. 27, 2019 in U.S. Appl. No. 15/462,903; 26 pages.

United States Patent and Trademark Office; Non-final Office Action dated Jun. 25, 2019 in U.S. Appl. No. 15/462,903; 29 pages.

U.S. Appl. No. 62/460,066, filed Feb. 16, 2017, titled "WIFI Antenna Selection with Beamforming"; ___ pages.

* cited by examiner

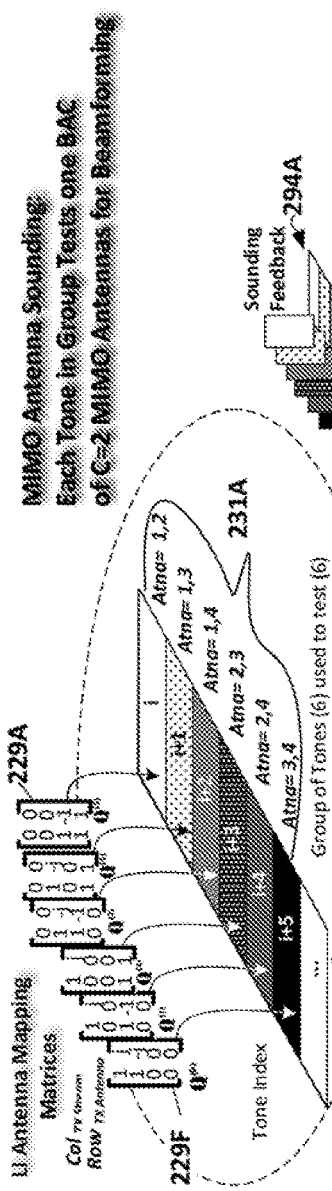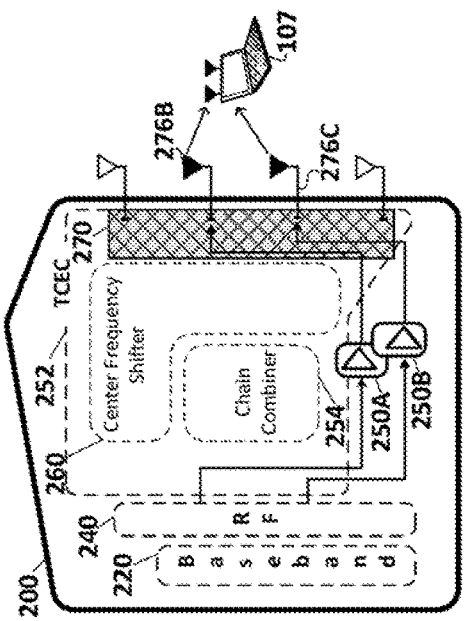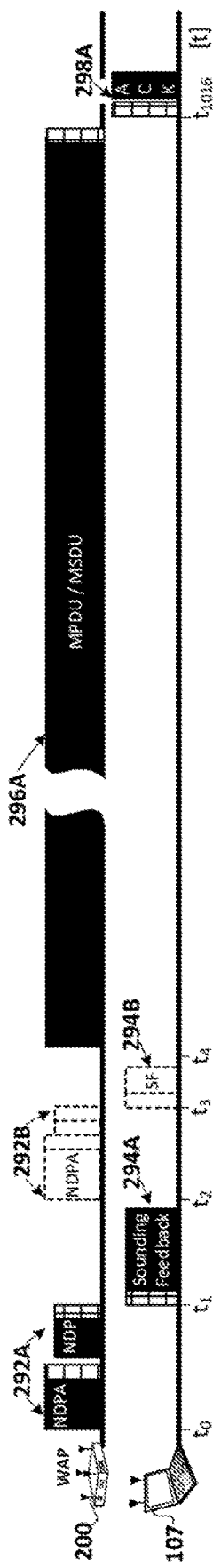
FIG. 2A
FIG. 2B
FIG. 2C

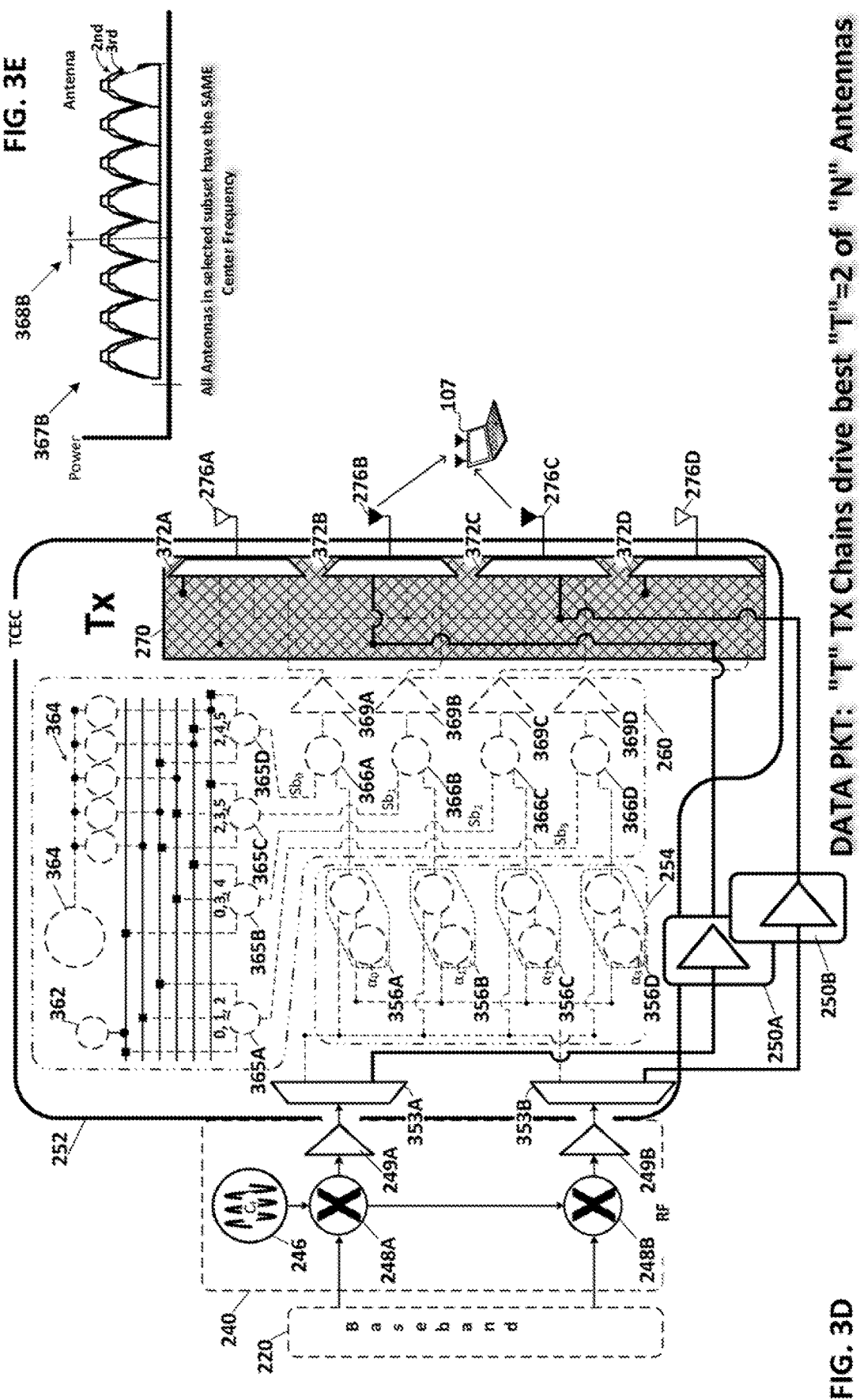

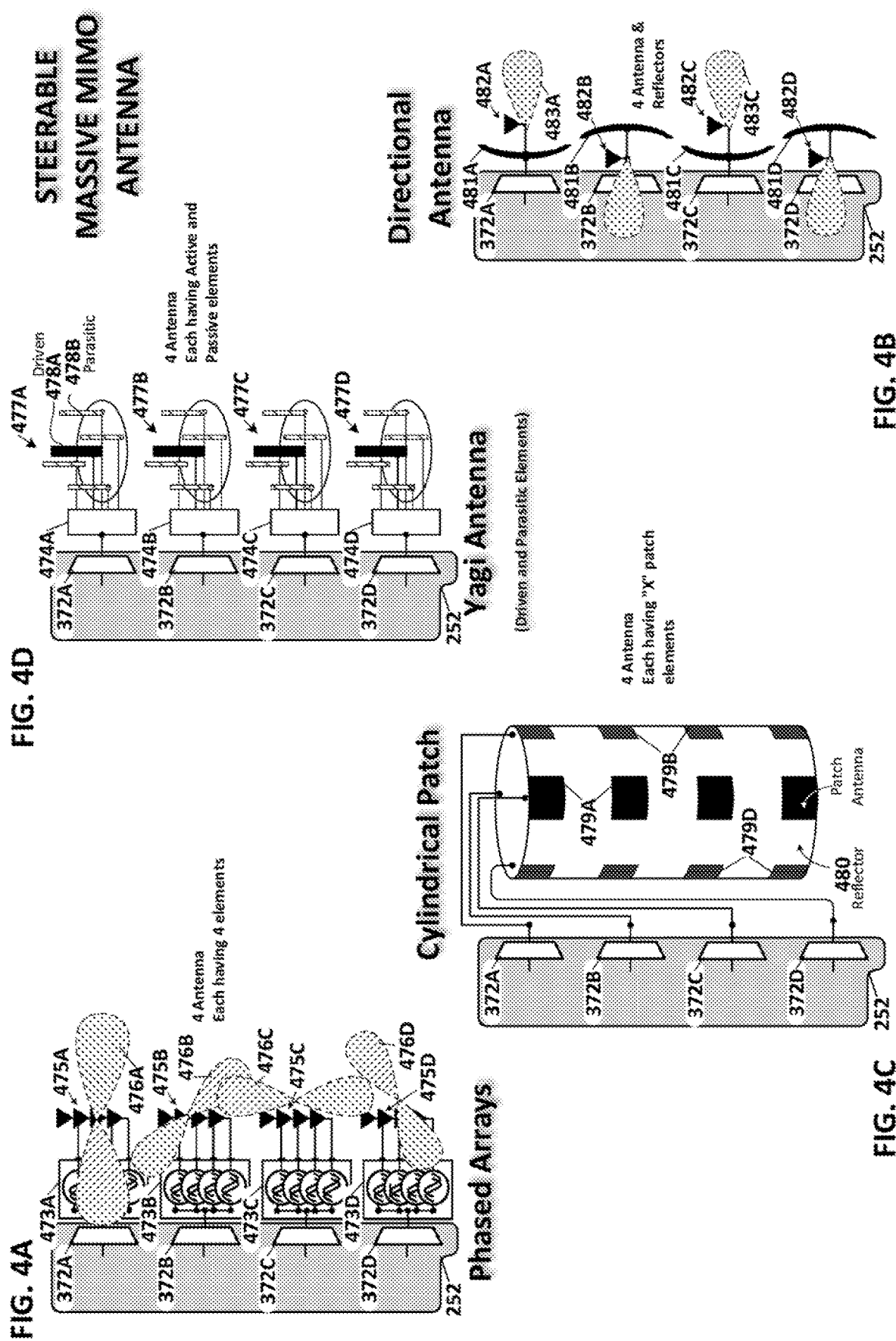

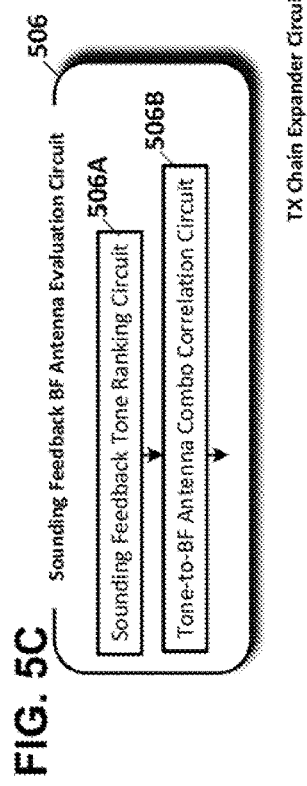
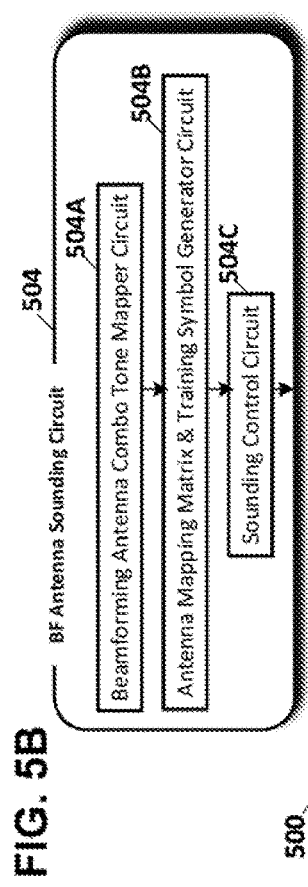
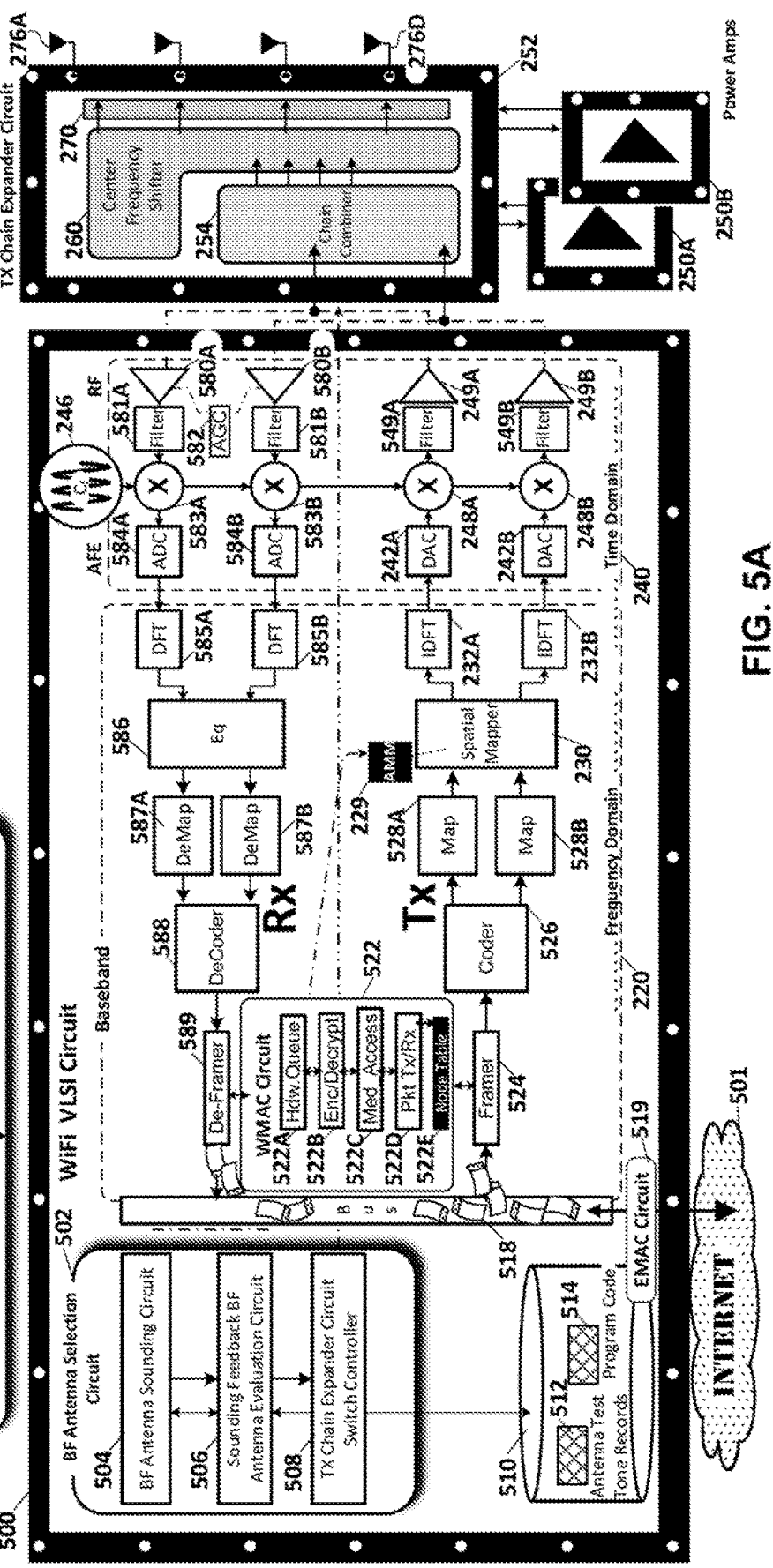

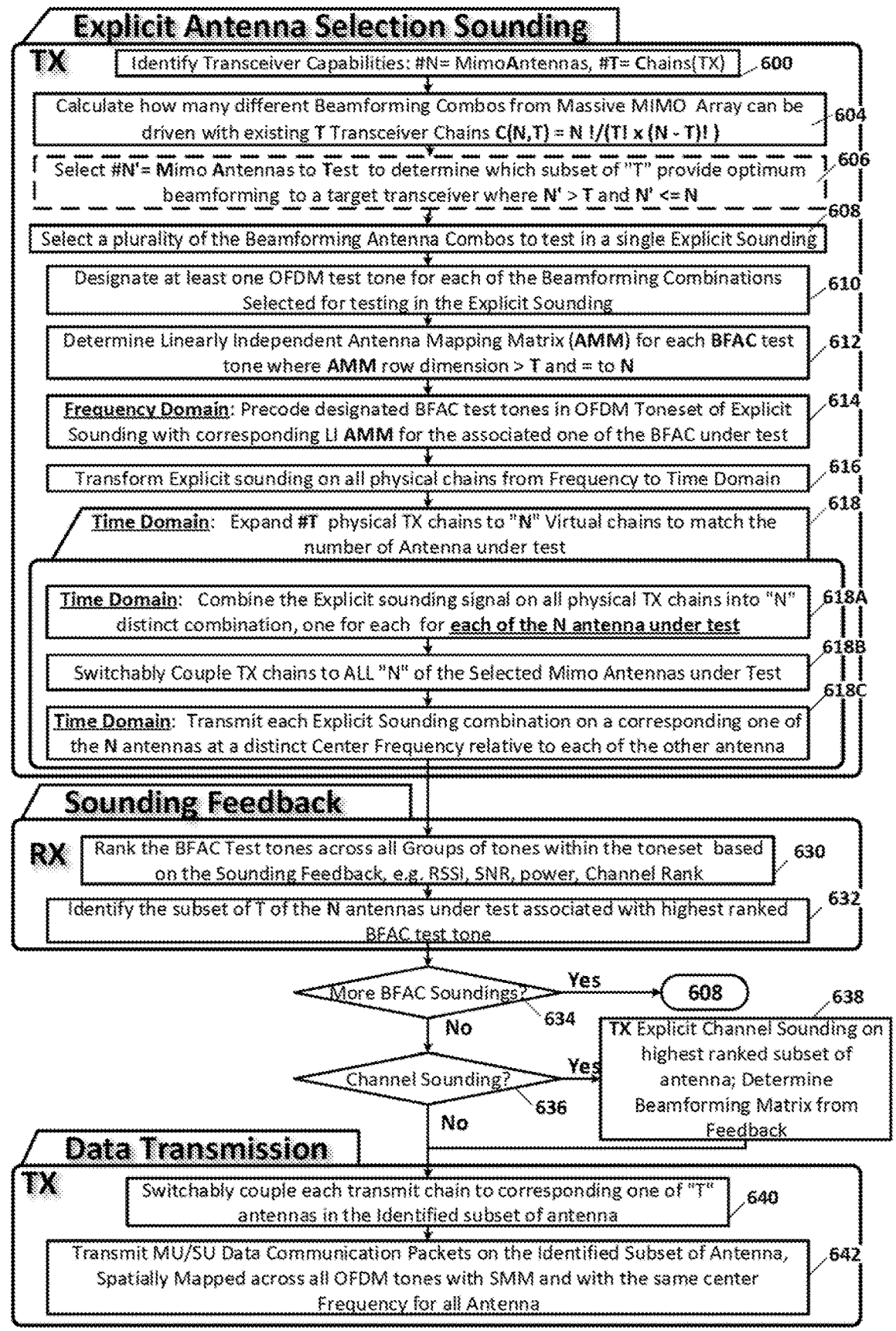
FIG. 6  Method for MIMO WiFi Transceiver Antenna Selection

WIFI ANTENNA SELECTION WITH BEAMFORMING

CROSS REFERENCE TO RELATED APPLICATIONS

This application claims priority to Provisional Application No. 62/460,066 filed on Feb. 16, 2017 entitled "*Antenna Selection with Beamforming*"; and to co-pending U.S. application Ser. No. 15/462,903, filed Mar. 19, 2017, entitled "WiFi Antenna Selection with Beamforming", both of which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and sounding methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

To characterize the communication channel between the WAP and each station, a sounding is conducted. An explicit sounding consists of the transmission of a known sequence from the WAP to each associated station, followed by a sounding response from the station characterizing the communication channel between the WAP and itself. The WAP uses the sounding response to focus its antennas in a manner which improves either or both signal strength at the station or downlink throughput thereto.

What is needed are improved methods for sounding each communication link between the WAP and its associated stations.

SUMMARY

The present disclosure provides a method and apparatus for a wireless transceiver, e.g. wireless access point (WAP) or station apparatus to enhance communications with target transceiver(s) over a massive Multiple-input Multiple-output (MIMO) array of antenna greater in number than the number of transmit chains on the transceiver. This surplus of antennas relative to transmit chains, allows the WAP to select an optimal subset of antennas equal in number to the number of transmit chains, for beamforming data communication packets.

In an embodiment, a circuit includes a beamform antenna selection circuit coupled to transmit chains. The beamform antenna circuit is to determine a number of possible combinations that the transmit chains may couple to an array of antennas, generate a set of antenna mapping matrices, the number of antenna mapping matrices in the set of antenna mapping matrices being equal to the number of possible combinations, generate, based on the set of antenna mapping matrices, a sounding packet to test the possible combinations, receive sounding feedback, determine a performance for each of the possible combinations based on the sounding feedback, wherein a particular combination has a highest ranked performance; and switchably couple the transmit chain to an antenna of the array of antennas that is associated with the particular combination with the highest ranked performance for transmission of subsequent data communication packets.

Aspect of this disclosure may be implemented in hardware, firmware or software.

Associated methods and circuits are also claimed.

BRIEF DESCRIPTION OF THE DRAWINGS

These and other features and advantages of the present invention will become more apparent to those skilled in the art from the following detailed description in conjunction with the appended drawings in which:

FIGS. 2A-C are hardware views of a transceiver during antenna sounding and data communication and a packet view of those same communication stages respectively;

FIGS. 3D-E are an exploded hardware view of the transmit chain expander circuit, and a per antenna tone graph during transmission of subsequent data communication packets on the highest ranked beamforming subset of antenna in accordance with an embodiment of the invention;

FIGS. 4A-D are hardware views of massive multiple-input multiple-output (MIMO) antenna arrays with individually steerable antennas in accordance with another embodiment of the invention;

FIGS. 5A-C are overall and detailed circuit diagrams of the WiFi transceiver with massive MIMO beamform antenna subset selection for each link in accordance with an embodiment of the invention; and FIG. 6 is a process flow diagram of processes associated with a massive MIMO transceiver's beamform antenna subset selection for each link in accordance with an embodiment of the invention.

DETAILED DESCRIPTION OF THE EMBODIMENTS

FIGS. 1A-D are Prior Art drawings of respectively a residential wireless local area network (WLAN), a packet diagram of a sounding packet, a system view of sequential soundings and data communication, and a packet exchange view of the sequential soundings and data communication.

Figure 1A:
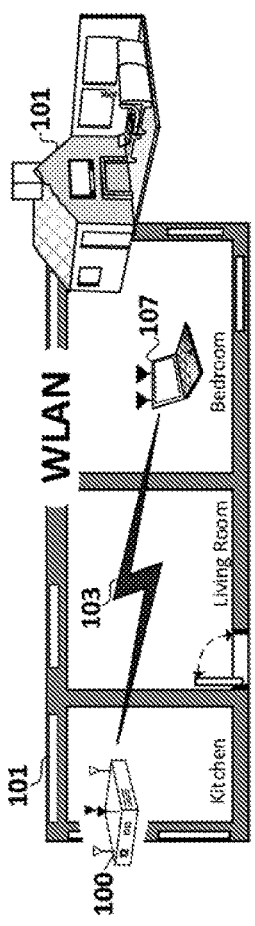
FIGS. 1A-D are drawings of respectively a plan view of a residential wireless local area network (WLAN), a packet diagram of a sounding packet, a system view of sequential soundings and data communication, and a packet exchange view of the sequential soundings to evaluate antenna subsets, and subsequent data communication.

FIG. 1A is a plan view of a residential WLAN in a home 101. The WLAN includes a wireless access point (WAP) 100 with four antennas and two transmit chains. The WAP is shown with a communication link 103 to a targeted station 107.

Figure 1B:
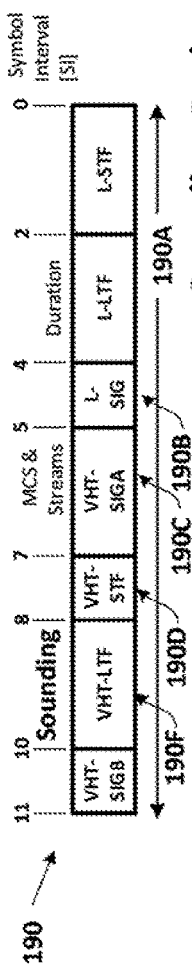

FIG. 1B is a packet diagram of a WLAN sounding packet including the sounding field thereof. All WLAN packets whether associated with communicating a sounding or with the communication of user data include a ubiquitous header portion. All WLAN packet headers include various preamble fields with known sequences which allow the receiving station to synchronize reception with packet boundaries and to determine the received channel. What makes a sounding packet a sounding packet is not the sounding field in the header, rather the null data packet announcement (NDPA) packet which precedes the sounding and identifies the receiving station(s) which are requested to share their channel analysis, e.g. CSI, with the transmitter so as to improve its subsequent communications. FIG. 1B shows a sounding packet 190 and the representative symbol intervals (SI) required to transmit each field thereof. The header 190A includes a legacy portion containing the L-STF, L-LTF and L-SIG fields and a very high throughput portion containing the VHT-SIG-A, VHT-STF, VHT-LTF and VHT-SIG-B fields. The legacy (L), long (LTF) and short (STF) training and signal (SIG) 190B fields are compatible with stations supporting only the IEEE 802.11n or earlier standards. The remaining signal and training fields are intended only for very high throughput, e.g. IEEE 802.11ac compliant devices. The VHT-SIG-A field 190C contains information on the modulation and coding scheme (MCS) and number of streams of the sounding. The VHT-STF field 190D is used for automatic gain control (AGC). The VHT-LTF field 190F, a.k.a. channel estimation or sounding field, contains a long training sequence used for MIMO channel estimation by the receiver.

Figure 1C:
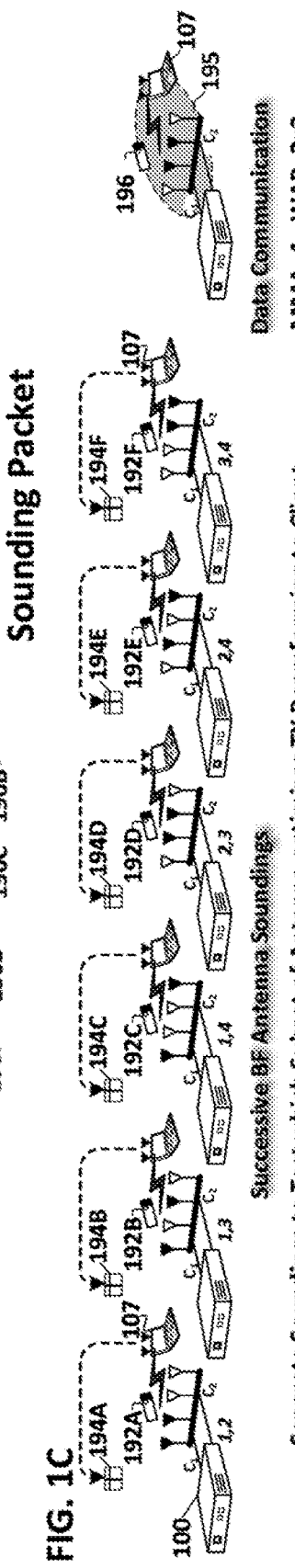

FIG. 1C is a system view of sequential soundings and data communication. Each sequential sounding 192A-F is conducted with the two transmit chains of the transceiver coupled to a distinct combination of two out of the four antennas, thus allowing the highest ranked subset of the antenna for a subsequent downlink beamformed data communication link to the targeted station 107 to be determined. Sounding packet 192A is transmitted on the $1^{st}$ and $2^{nd}$ out of the four antennas, and in response a sounding feedback packet 194A is received from the targeted station 107. The sounding feedback packet contains channel state information (CSI) for the channel between the transmitter and receiver. If the receiving station is IEEE 802.11n compliant the sounding feedback is in the form of a channel matrix "H". If the receiving station is IEEE 802.11ac compliant the sounding feedback is in the form of the actual unitary beamforming matrix V and the per tone diagonal matrix $\Sigma$ which is directly related to the per tone signal-to-noise ratio (SNR). A second sounding packet 192B is transmitted on the $1^{st}$ and $3^{rd}$ of the four antennas, and a sounding feedback packet 194B is received from the targeted station 107. The third sounding packet 192C is transmitted on the $1^{st}$ and $4^{th}$ antennas, and a sounding feedback packet 194C with the resultant channel state information (CSI) is received from the targeted station. The fourth sounding packet 192D is transmitted on the $2^{nd}$ and $3^{rd}$ antennas, and the sounding feedback packet 194D is received from the targeted station. The fifth sounding packet 192E is transmitted on the $2^{nd}$ and $4^{th}$ antenna, and the CSI for that subset of antenna is received in sounding feedback packet 192E from the targeted station. The sixth and final sounding packet 192F in the sequential sounding is transmitted on the $3^{rd}$ and $4^{th}$ of the four antennas, and the final sounding feedback packet in the sequence, feedback packet 194F is received from the targeted station 107. Once all distinct beamforming candidates, i.e. subsets of antenna have been evaluated by the WAP 100 the highest ranked subset is used for subsequent transmission of communication data packets 196 to the receiving station 107. Ranking may be based on any one or all of: Received Signal Strength Indication (RSSI), signal-to-noise ratio (SNR) and Channel ranking, for example. The process is repeated by the WAP for each station targeted for downlink communications on the WLAN.

Figure 1D:
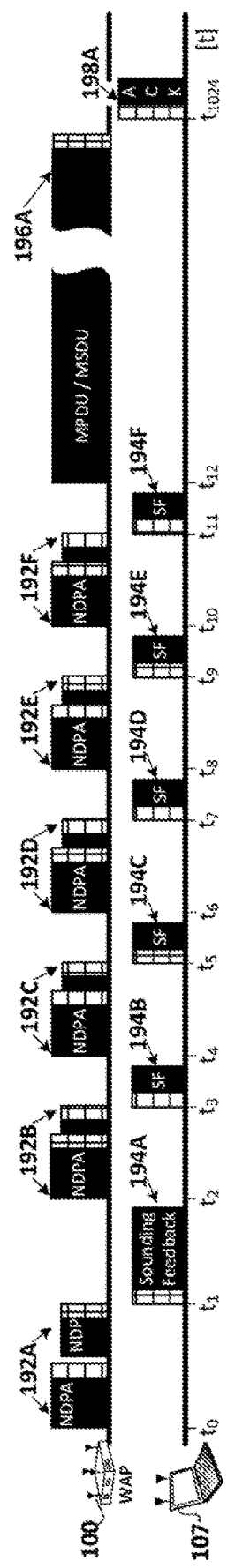

FIG. 1D is a packet view of sequential soundings and data communication shown in FIG. 1C. The WAP transmits a pair of sounding packets 192A, i.e. a Null Data Packet Announcement (NDPA) followed by a null data packet (NDP) with the actual sounding field, and in response the targeted station sends back a sounding feedback response packet 194A. The time and overhead required to send all six soundings 192-194A-F is considerable. All packets including those associated with the sounding, include a header portion shown in crosshatch. Following the sounding, communications resume and downlink communication of user data is sent on the link(s) that have been sounded. These user data packet(s), a.k.a. media access control (MAC) Service Data Unit (MSDU) or Protocol Data Unit (MPDU) 196A are sent using the associated beamforming matrix determined during the preceding sequence of soundings. The receiving station 107 sends an acknowledgement packet "ACK" 198A in response. The explicit sounding may be initiated by a WAP or a station. The overhead involved in this sequential approach to selecting a subset of antennas equal to the number of transmit chains of the massive MIMO antenna array is significant. The following FIGS. 2-6 shown an embodiment of the invention for reducing this overhead by evaluating multiple distinct subsets of the antenna as candidates for subsequent beamformed communications.

FIGS. 2A-C are hardware views of a transceiver during antenna sounding and data communication and a packet view of those same communication stages respectively.

FIG. 2A is a hardware view of a wireless transceiver 200, e.g. WAP or station, during antenna sounding. The wireless transceiver, e.g. WAP 200, includes a baseband stage 220, a combined Analog Front End (AFE) and Radio Frequency (RF) stage 240, a transmit chain expander circuit 252, power amplifiers 250A-B, and the massive MIMO antenna array with the number "N"=4 antenna 276A-D. Only the transmit chains of the transceiver have been shown for clarity. The transceiver has two transmit chains, formed by a plurality of shared and discrete components coupled to one another in the baseband through RF stages, including: corresponding one of encoder/mappers 227A-B, spatial mapper 230, Inverse Discrete Fourier Transform 232A-B, Digital-to-Analog Converters (DAC)s 242A-B, filters 244A-B, upconverters 248A-B, carrier frequency voltage controlled oscillator 246, and low voltage amplifiers 249A-B. Baseband components prior to the IDFT are said to handle transmit processing in the frequency domain, while those after the IDFT are said to handle transmit processing in the time domain.

In this case of four antennas and two transmit chains, we'd like to map the two transmit chains to the four antennas, but in such a way that the antenna mapping is different for different tones. While this is conceptually what we want to achieve, it cannot be done directly as with traditional spatial mapping between streams and transmit chains. The goal is to transform the spatial mapping to a form that needs no more than two transmit chains and that connects the output of these two transmit chains to the four antennas using the transmit chain expander circuit that can be easily implemented in the time-domain. For the case under consideration (two transmit chains vs. four antennas), there are six possible ways to map transmit chains to antennas, namely: 1&2, 1&3, 1&4, 2&3, 2&4, and 3&4. If we want to cover all these mappings in our sounding frame, we need six different linearly independent antenna mapping matrices (AMM) e.g. matrices 229A-F, where each tone in the group test one beamforming antenna combination of Chains=2, MIMO antennas for subsequent beamformed communications. We'll distribute them equally throughout the toneset 231 of the selected communication channel such that the antenna mapping matrices repeat every six tones and further such that each group of six consecutive tones, e.g. group 231A, has the same training constellation point. The antenna mapping matrices differ from prior art spatial mapping matrices in that they have a number of rows equal to the number of antenna under test, i.e. 4 antennas in the instant example, rather than a number of rows equal to the number of transmit chains, i.e. 2 chains in the instant example.

Next, on the transmit path, the IDFTs transform the frequency domain signals to two time-domain signals output by the IDFTs. These are mapped to the four antennas using a mapping matrix which depends on a linear combination of all frequency-dependent mapping matrices and also exhibits time-dependency. The signals time domain signals can be generated using the two transmit chains that we have available. In the more general case, the number of signals will correspond to the number of available transmit chains. The main question is how to efficiently implement the antenna mapping in the time domain and the transmit chain expander circuit 252 accomplishes this task with a chain combiner circuit 254 and a center frequency shifter circuit 260. The chain combiner circuit 254 accepts the input from the two chains, and generates outputs equal in number to the number of antenna under test, e.g. 4. Each of the four outputs from the chain combiner is distinct combination of the two transmit chains at the input. The only required operations for the chain combiner circuit 254 are additions and phase rotations of multiple of 90 degrees of the two transmit chains. All of these operations can be executed in the time domain.

The second step of the operations performed by the transmit chain expander circuit is performed by the center frequency shifter circuit 260. This circuit accepts input of the four distinct transmit chain combinations, and multiplies each of those four intermediate outputs with a distinct polynomial sum, e.g. a sum of sinusoids. This too is something that can be implemented directly in the time-domain. All operations can be performed in the time-domain and we get the benefit that multiple possible beamform antenna combinations, i.e. multiple subsets of 2 of the four antennas, can be sounded with a single sounding frame. The crossbar switch 270 couples all the Massive MIMO antenna 276A-D to the expanded transmit chains during sounding.

In an embodiment of the invention the connections could be done in either analog or digital domain. The output the "baseband" block could be analog signals in which case the connections and multiplications are performed by analog blocks. Alternatively, the outputs, combining and multiplications could be done in digital with the final signals then being fed into a discrete set of ADCs.

In response to the sounding, the targeted receiving transceiver, e.g. station 107, performs a normal channel state information (CSI) analysis for each tone just as it would for a standard explicit sounding, in terms of for example: a channel matrix "H"; a beamforming matrix "V"; or a per tone sigma matrix, equivalent to a per tone signal-to-noise (SNR) matrix. The receiver then sends this per tone explicit sounding feedback 295A in a responsive feedback packet to the transceiver 200. The transceiver then ranks this feedback tone by tone for each tone in each group, e.g. group 231A across the entire toneset, and based on any one or all of: Received Signal Strength Indicia (RSSI) or SNR, or channel rank for example, determines which tone in each group, exhibits the highest rank. The transceiver 200 then correlates the highest ranked tone with the corresponding subset of 2 of the 4 antennas that were mapped by the AMM to that tone, and initiates subsequent downlink communications using just the highest ranked subset of antenna for downlink packet transmission, as is shown in FIG. 2B.

FIG. 2B is a hardware view of the transceiver 200 during subsequent data communication after the sounding in which the optimal, a.k.a. highest ranked, subset of the WAP's antennas has been determined. During this phase of operations, the WAP transmits downlink user data communication packets to the station 107 via the highest ranked subset of 2 of the transceiver's four antennas, e.g. antennas 276B-C. During this phase of operations, the transmit chain expander circuit 252 internally disconnects the two input transmit chains at the low voltage amplifiers 259A-B from the chain combiner and center frequency shifter and switchably couples the two transmit chains instead to the inputs of a corresponding one of the high voltage power amplifiers 250A-B. The transmit chain expander circuit, and specifically the crossbar switch portion 270 thereof couples the outputs of the high voltage power amplifiers to a corresponding one of the selected subset of antennas 276B-C for downlink user data packet transmission to the transceiver 107. The downlink user data packets are spatially mapped by the spatial mapper of the baseband stage using beamforming matrices having rows equal in number to the number of transceiver chains, e.g. two rows for the example shown.

In an embodiment of the invention the CSI sounding feedback 295 obtained in response to the antenna sounding for the highest ranked tones may be used to determine the beamforming matrices for all tones during subsequent transmission of user data packets. In this embodiment of the invention interpolated variants of the beamforming matrices for the highest ranked tones are used for precoding the remaining tones. Alternately, where the number of combinations of subsets of antennas is large, and the number of tones in each group is correspondingly large, beamforming matrix interpolation may not be accurate enough given the tone spread between the highest ranked tone in each group, and another sounding of a traditional nature, a.k.a. a channel sounding, may be required. This sounding will be conducted on all tones, with a traditional spatial mapping matrix with rows equal to the number chains, and with each chain coupled by the transmit chain expander circuit to a corresponding one of the antennas of the highest ranked subset of the massive MIMO antenna array, e.g. the antenna 276B-C in the example shown.

FIG. 2C is a packet view of the sounding and data communication stages. Only a single sounding 292A and sounding feedback 294A is required to determine which of the six combinations of 2 of the 4 antenna is optimal for subsequent beamformed communication link with the targeted receiver. Where the transceiver has 4 chains and 8 antennas, there would be 70 discrete combinations of 4 of the 8 antennas to evaluate, resulting in only one highest ranked tone in each group of 70 tones. In this latter case, an additional sounding 292B of a traditional nature could be utilized using the selected highest ranked subset of antenna, to determine from the sounding feedback 294B for each tone the beamforming matrices therefore, without any interpolation. In either case, the sounding related overhead per link is greatly reduced compared to the example shown in FIGS. 1C-D. Once the beamforming matrices have been determined from sounding feedback, the subsequent user data packet transmissions, e.g. MPDU or MSDU, packets are transmitted on the highest ranked subset of two of the WAP's four antenna, i.e. antenna 276B-C to the receiving station 107. Each user data packet received by the station is acknowledged in an "ACK" packet 298A.

Figures 3A, 3B, 3C:
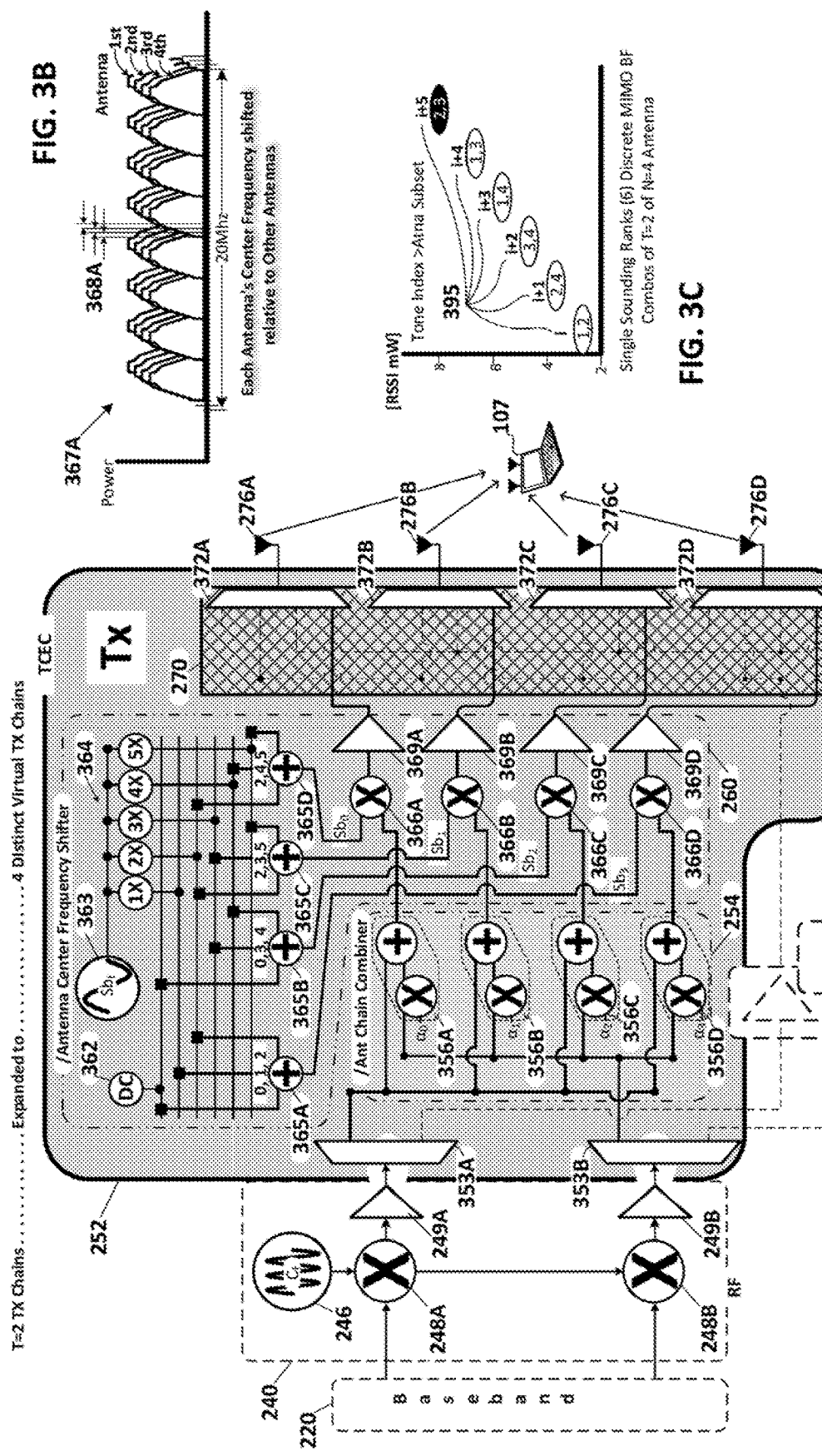
FIGS. 3A-C are an exploded hardware view of the transmit chain expander circuit, a per antenna tone graph, and a graph of beamforming efficiency for various antenna subsets during transmission of an antenna sounding in accordance with an embodiment of the invention.

FIGS. 3A-C are an exploded hardware view of the transmit chain expander circuit, a per antenna tone graph, and a graph of beamforming efficiency for various antenna subsets during transmission of an antenna sounding in accordance with an embodiment of the invention.

FIG. 3A is an exploded hardware view of the transmit chain expander circuit 252 shown in FIG. 2A during transmission of an antenna sounding in accordance with an embodiment of the invention. In this embodiment of the invention, the transmit chain expander circuit is positioned in the transmit path after the carrier frequency upconverters 248A-B for each chain. These upconverters are driven by the carrier frequency voltage controlled oscillator 246. In the case of an IEEE 802.11ac compliant transceiver in the 5 GHz band, if the selected channel is the lowest 20 MHz channel, then the carrier frequency VCO 246 is tuned to 5.035 GHz. The two transmit chains output by low power amplifiers 249A-B provide inputs to the transmit chain expander circuit 252 via switches 353A-B shown as demultiplexers. These switches in conjunction with their crossbar switch counterpart 270 either switch the two transmit chains through the antenna chain combiner and antenna center frequency shifter to all antennas 276A-D during antenna sounding, or avoid these sub circuits entirely during subsequent transmission of beamformed data packets via power amplifiers 250A-B and the selected highest ranked subset of two of the four antennas.

During antenna sounding the transmit chain combiner circuit 254 accepts the input from the two chains via input switches 353A-B and generates outputs equal in number to the number of antenna under test, e.g. the four antenna 276A-D. Each of the four outputs from the chain combiner is a distinct combination of the two transmit chains. The only required operations for the chain combiner circuit 254 are additions and phase rotations of multiple of 90 degrees of the two transmit chains. All of these operations can be executed in the time domain. Specifically, the per antenna chain combiner circuit 254 includes chain combiner circuit blocks 356A-D equal in number to the number of Massive MIMO antenna. Each circuit block includes in this embodiment of the invention, a multiplier and an adder. The multiplier scales one of the chains with a discrete phase and amplitude scalier alpha, where for example alpha=+−1, +−j, for example. The discretely scaled outputs of the second transmit chain are then added to the signal on the first chain.

The second step of the operations performed by the transmit chain expander circuit is performed by the per antenna center frequency shifter circuit 260. This circuit accepts input of the four distinct transmit chain combinations from the antenna chain combiner at a corresponding one of multipliers 366A-D. Each of the multipliers multiplies each of those four intermediate outputs with a distinct polynomial sum, e.g. a sum of sinusoids. A subcarrier bandwidth oscillator 363 is shown, coupled to a bank of 1×, 2×, 3×, 4×, 5× frequency scalers 364 is shown along with a DC source 362. Each adder 365A-D is shown summing distinct combinations of three of the subcarrier bandwidth scalers. Adder 365A sums: a DC value from DC source 362, the subcarrier bandwidth with a unitary frequency scalar, and the subcarrier bandwidth with a 2× frequency scalar. The output of adder 365A is coupled to an input of multiplier 366A.

The polynomial sums output by the corresponding one of adders 365A-D to a corresponding one of multipliers 366A-D are distinct combinations of integer multiples, e.g. 0×,1×,2×,3×,4×,5× of the subcarrier bandwidth which in the case of an IEEE 802.11ac compliant transceiver in one of the 5 GHz band channels is 312.5 kHz. So, the distinct overall center frequency shift on any of the antenna resulting from the injection of polynomial shift sums during sounding corresponds to a small fraction of the overall carrier frequency, e.g. less than 0.01%. The center frequency shifted output from the multipliers 366A-D is amplified in a corresponding one of amplifiers 369A-D and the output of each amplifier is coupled via the crossbar output switch 270 and specifically a corresponding one of the multiplexers 372A-D thereof, to the corresponding one of antennas 276A-D. In this embodiment of the invention the crossbar output switch is shown as a bank of four multiplexers 272A-D each of which couples a corresponding one of the Massive MIMO antenna 276A-D to the expanded transmit chains during sounding.

In an alternate embodiment of the invention the transmit chain expander circuit is implemented before upconversion by the upconverters 248A-B rather than after.

FIG. 3B is a per antenna tone graph of power vs frequency during transmission of an antenna sounding in accordance with an embodiment of the invention. The OFDM tones 367A on each antenna are shown as discrete rows across a 20 MHz channel with the minute incremental shift in average center frequency 368A resulting from the antenna center frequency shifter, producing a slight misalignment of the channels transmitted by the $1^{st}$, $2^{nd}$, $3^{rd}$ and $4^{th}$ antenna relative to one another during antenna sounding.

FIG. 3C is a graph of RSSI for various sounded beamforming antenna subsets of two antennas each on corresponding tones in each group. The graph shows the average RSSI determined from sounding feedback for each of six tones 395 within the group of six averaged out across all groups across the OFDM toneset of the selected communication channel. The tone index in each group and the corresponding subset of two antennas is shown. The highest ranked tone is the one in each group with index i+5, and the corresponding antenna subset is antennas 2,3. This graph of beamforming efficiency for various antenna subsets during transmission of an antenna sounding shows that antennas "2,3" are the highest ranked subset of antenna, with the greatest RSSI of any of the other antenna subsets. The highest and lowest ranked antenna subset differ in RSSI by a factor of 4×. These are then highest ranked subset of antenna in the Massive MIMO array for subsequent beamformed transmission of user data packets.

FIGS. 3D-E are an exploded hardware view of the transmit chain expander circuit, and a per antenna tone graph during transmission of subsequent data communication packets on the highest ranked beamforming subset of antenna in accordance with an embodiment of the invention.

FIG. 3D is an exploded hardware view of the transmit chain expander circuit during transmission of subsequent data communication packets on the highest ranked beamforming subset of antenna as determined in the antenna sounding. During this phase of operations, the WAP transmits downlink user data communication packets to the station 107 via the highest ranked subset of 2 of the transceiver's four antennas, e.g. antennas 276B-C. During this phase of operations, the transmit chain expander circuit 252 and specifically the input switches 353A-B disconnect the two transmit chains at the low voltage amplifiers 259A-B from the chain combiner and center frequency shifter and switchably couples the two transmit chains instead to the inputs of a corresponding one of the high voltage power amplifiers 250A-B. The transmit chain expander circuit, and specifically the multiplexers 372A-D of the crossbar switch 270 couple the outputs of the high voltage power amplifiers to a corresponding one of the selected subset of antennas 276B-C for downlink user data packet transmission to the transceiver 107. The downlink user data packets are spatially mapped by the spatial mapper of the baseband stage using beamforming matrices having rows equal in number to the number of transceiver chains, e.g. two rows for the example shown.

FIG. 3E is a per antenna tone graph of power vs frequency during transmission of subsequent data communication packets on the highest ranked beamforming subset of antenna, e.g. antenna 276B-C the $2^{nd}$ and $3^{rd}$ antenna respectively. The OFDM tones 367B on each antenna 276B-C are shown as discrete rows across a 20 MHz channel without any of the shift in center frequency exhibited during sounding. Instead the transmitting subset of antenna both have the same center frequency 326B.

In the examples shown above the number of antenna is small, and the number of transmit chains is a significant fraction of the eligible transmit antenna. In an embodiment of the invention where the number of antenna is large and the number of transmit chains is substantially smaller, there will be so many antenna subset combinations to evaluate that more than one sounding may be required. Each antenna sounding will nevertheless provide ranking information for multiple beamforming antenna subset candidates, thus significantly reducing the sounding overhead required to determine the optimal/highest ranked subset of antenna for subsequent transmission of user data packets.

FIGS. 4A-D are hardware views of massive multiple-input multiple-output (MIMO) antenna arrays with individually steerable antennas in accordance with another embodiment of the invention. The Massive MIMO antenna arrays shown in the prior figures individually exhibit generally symmetrical, a.k.a. isotropic, signal strength footprints and can be collectively beamformed via spatial mapping and resultant shifts in phase and amplitude of the transmitted signal to produce regions of constructive interference between the signals transmitted by each of the antenna at a targeted station. By contrast the Massive MIMO antenna arrays shown in FIGS. 4A-D have individual antenna each of which exhibits asymmetrical, a.k.a. anisotropic, signal strength footprints. The anisotropic signal strength footprint of each antenna may be either fixed or tunable, without departing from the scope of the claimed invention.

FIG. 4A shows a massive MIMO antenna comprising 4 phased arrays of 4 elements each. Each of the antenna arrays 475A-D has a distinct anisotropic signal strength footprint, 476A-D respectively. The spatial orientation of each of antenna arrays 475A-D is achieved by four individual sub-elements which are spatially biased by means of a corresponding antenna driver 473A-D which varies the phase and amplitude of the signals output by each antenna's sub-elements. Each antenna driver 473A-D may impart a fixed spatial bias to its associated array via fixed changes in the phase and amplitude of an input signal from the corresponding one of multiplexers 372A-D. In another embodiment of the invention the antenna drivers may be individually tunable in both phase and amplitude of the signals transmitted on each of their associated antenna arrays, thereby adjusting the spatial orientation of the antenna. Where the spatial orientation of each of antennas 475A-D is fixed, a single antenna sounding may be used to select the optimal or highest ranked subset of antenna for subsequent use in beamformed transmission of user data packets to a targeted receiving station. Where the spatial orientation of each of antennas 475A-D is tunable, multiple antenna soundings may be required with each sounding providing ranking information for multiple subsets of beamforming candidates.

FIG. 4B shows a massive MIMO antenna comprising 4 Yagi antenna 477A-D, each of which includes a driven element and one or more parasitic elements. Driven/active and parasitic/passive elements 478A-B respectively for antenna 477A are shown. Each of the Yagi antennas 477A-D has a distinct anisotropic signal strength footprint. The spatial orientation of each Yagi antenna is achieved by one or more parasitic elements the impedance of which is controlled by means of a corresponding antenna driver 474A-D which varies the impedance of each of the antenna's parasitic elements to spatially shape the antennas RF signal strength footprint. Each antenna driver 474A-D may impart a fixed spatial bias to its associated Yagi antenna via fixed impedance settings for the passive elements. The driven element accepts an input signal from the corresponding one of multiplexers 372A-D. In another embodiment of the invention the antenna drivers may tune the parasitic elements on each of corresponding Yagi antenna, thereby adjusting the spatial orientation of the antenna. Where the spatial orientation of each of antennas 477A-D is fixed, a single antenna sounding may be used to select the optimal or highest ranked subset of antenna for subsequent use in beamformed transmission of user data packets to a targeted receiving station. Where the spatial orientation of each of antennas 477A-D is tunable, multiple antenna soundings may be required with each sounding providing ranking information for multiple subsets of beamforming candidates.

FIG. 4C shows a massive MIMO antenna comprising multiple patch antenna affixed to a reflective cylinder 480. Each set of one or more patch antenna is driven by a sounding signal from a corresponding one of the multiplexers 372A-D during sounding. Multiplexer 372A is coupled to patch antennas 479A. Multiplexer 372B is coupled to patch antennas 479B. Multiplexer 372C is coupled to patch antennas, not shown. Multiplexer 372D is coupled to patch antennas 479D. The spatial orientation of each set of patch antennas is governed by their fixed position on the RF reflective cylinder. Thus, no antenna driver is required to impart spatial bias, a.k.a. anisotropic signal strength footprints to each set of patch antenna. A single antenna sounding may be sufficient to select the optimal or highest ranked subset of antenna for subsequent use in beamformed transmission of user data packets to a targeted receiving station.

FIG. 4D shows a massive MIMO antenna comprising multiple antenna 482A-D each with a corresponding parabolic reflector 481A-D respectively. Each directional antenna 482A-D is driven by a sounding signal from a corresponding one of the multiplexers 372A-D during sounding. The spatial orientation of each antenna is governed by its fixed parabolic reflector. A single antenna sounding may be sufficient to select the optimal or highest ranked subset of antenna for subsequent use in beamformed transmission of user data packets to a targeted receiving station.

FIGS. 5A-C are overall and detailed circuit diagrams of the WiFi transceiver with massive MIMO beamform antenna subset selection for each link in accordance with an embodiment of the invention.

FIG. 5A is a detailed hardware block diagrams of a wireless transceiver in accordance with an embodiment of the current invention in which the transceiver comprises discrete interconnected very large scale integrated circuits (VLSI). Specifically, a VLSI WiFi stage circuit 500 which includes the WiFi transmit and receive baseband and AFE/RF circuits 220, 240 respectively; a transmit chain expander VLSI circuit 252 which includes the chain combiner circuit 254 and center frequency shift circuit 260; power amplifier circuits 250A-B; and antennas 276A-D. The wireless transceiver may be a WAP or a station. The transceiver supports wireless communications on a wireless local area network (WLAN) which network provides associated stations, access to the Internet 501.

The transceiver in this embodiment of the invention is a WAP identified as a 2×2×4 multiple-input multiple-output (MIMO) WAP supporting as many as 2 discrete communication streams over two out of the 4 antennas 276A-D. The transceiver couples to the Internet 501 via an Ethernet medium access control (EMAC) interface 519 over a cable, fiber, or digital subscriber line (DSL) backbone connection. A packet bus 518 couples the EMAC to the MIMO WiFi baseband 220, and the analog front end (AFE) and Radio Frequency (RF) stages 240.

In the baseband portion 220 wireless communications transmitted to or received from each user/client/station are processed. The baseband portion is dynamically configurable to support SU-MIMO or MU-MIMO transmission to MU groups of two or more users/stations. The antenna soundings of the current invention are equally applicable to SU-MIMO or MU-MIMO. In the case of MU-MIMO beamform antenna subset evaluation, the feedback from more than one targeted station is evaluated to determine which subset of antenna offers the best beamforming for the targeted stations. The AFE and RF portion 240 handles the upconversion on each of transmit paths and wireless transmission initiated in the baseband. The RF portion also handles the downconversion of the signals received on the receive paths and passes them for further processing to the baseband.

TRANSMISSION: The transmit path/chain includes the following discrete and shared components. The WiFi medium access control (WMAC) component 522 includes: hardware queues 522A for each downlink and uplink communication stream; encryption and decryption circuits 522B for encrypting and decrypting the downlink and uplink communication streams; medium access circuit 522C for making the clear channel assessment (CCA), and making exponential random backoff and re-transmission decisions; and a packet processor circuit 522D for packet processing of the communication streams. The WMAC component has a node table 522E which lists each node/station on the WLAN, the station's capabilities, the corresponding encryption key, and the priority associated with its communication traffic.

Each sounding or data packet for wireless transmission on the transmit path components to one or more stations is framed in the framer 524. Next each stream is encoded and scrambled in the encoder and scrambler 526 followed by interleaving and mapping in a corresponding one of the interleaver mappers 528A-B. Next all transmissions are spatially mapped in the spatial mapper 230 with an antenna mapping matrix (AMM) 229 during antenna sounding, a spatial mapping matrix (SMM) during any channel sounding, or a beamforming matrix "V" for transmission of user data packets subsequent to a sounding. The spatially mapped streams from the spatial mapper are input to Inverse Discrete Fourier Transform (IDFT) components 232A-B for conversion from the frequency to the time domain and subsequent transmission in the AFT and RF stage 240.

Each IDFT is coupled to a corresponding one of the transmit path/chain components in the AFE/RF stage 240. Specifically, each IDFT couples to an associated one of the digital-to-analog converters (DAC) 242A-B for converting the digital transmission to analog, upconverters 248A-B, coupled to a common channel frequency voltage controlled oscillator (VCO) 246 for upconverting the transmission to the appropriate center frequency of the selected channel(s), filters 549A-B, e.g. bandpass filters, for controlling the bandwidth of the transmission, and low voltage power amplifiers 249A-B. During antenna sounding the outputs of the low voltage power amplifiers are coupled through the chain combiner 254 and the center frequency shifter 260 to all the Massive MIMO antenna 276A-D for concurrent evaluation of multiple subsets or in this case, distinct pairs of antenna in the antenna array. During subsequent transmission of user data packets the outputs of the low voltage power amplifiers are coupled directly through the corresponding one of the high voltage power amplifiers 250A-B to a highest ranked subset of two of the four antennas.

RECEPTION: The receive path/chain includes the following discrete and shared components. Received communications on the transceiver's array of MIMO antenna are subject to RF processing including downconversion in the AFE-RF stage 240. There are two receive paths each including the following discrete and shared components: low noise amplifiers (LNA) 580A-B for amplifying the received signal under control of an analog gain control (AGC) 582 for setting the amount by which the received signal is amplified, filters 581A-B for bandpass filtering the received signals, downconverters 583A-B coupled to the VCO 246 for downconverting the received signals, analog-to-digital converters (ADC) 584A-B for digitizing the downconverted signals. The digital output from each ADC is passed to a corresponding one of the discrete Fourier transform (DFT) components 585A-B in the baseband portion 220 of the WiFi stage for conversion from the time to the frequency domain.

Receive processing in the baseband stage includes the following shared and discrete components: an equalizer 586 to mitigate channel impairments which is coupled to the output of the DFTs 585A-B. The received streams at the output of the equalizer are subject to demapping and deinterleaving in a corresponding number of the demapper/deinterleavers 587A-B. Next the received stream(s) are decoded and descrambled in the decoder and descrambler component 588, followed by de-framing in the deframer 589. The received communication is then passed to the WMAC component 522 where it is decrypted with the decryption circuit 522B and placed in the appropriate upstream hardware queue 522A for upload to the Internet 501.

The transceiver also includes a beamform (BF) Antenna Selection (BFAS) circuit 502 coupled to the plurality of components that form the transmit and receive path as well as to the transmit chain expander circuit 252. The BFAS controls sounding and selection of the subset of antennas used for transmission of user data packets. The BFAS circuit includes a beamforming antenna sounding circuit 504, a sounding feedback beamforming antenna evaluation circuit 506, and a transmit chain expander circuit switch controller 508. The BFAS circuit 502 is coupled to non-volatile memory/storage 510 containing in an embodiment of the invention, program code 514 for executing the antenna sounding, feedback, and switch control functions on a VLSI processor circuit. The storage also includes antenna test tone records 512.

The beamforming antenna sounding circuit 504 shown in FIG. 5A and in exploded hardware view in FIG. 5B includes: a beamforming antenna combination tone mapper circuit 504A, an antenna mapping matrix and training symbol generator circuit 504B, and a sounding control circuit 504C. The beamforming antenna combination tone mapper circuit 504A identifies the transceiver capabilities, determines using combinatorics how many distinct beamformed antenna subsets of the massive MIMO array can be driven with existing Transceiver Chains and maps of OFDM tones to specific beamformed antenna subsets to test in the antenna sounding. The antenna mapping matrix and training symbol generator circuit 504B determines a linearly Independent Antenna Mapping Matrix (AMM) for each BFAC test tone and a common training symbol for each group of test tones. Antenna test tone records 512 of these AMM, to tone, to antenna subset mappings are stored in storage 510. The sounding control circuit 504C injects the antenna mapping matrices into the spatial mapper 230 during the antenna sounding.

The sounding feedback beamforming antenna evaluation circuit 506 shown in FIG. 5A and in exploded hardware view in FIG. 5C includes: a sounding feedback tone ranking circuit 506A, and a tone-to-beamform antenna subset/combination correlation circuit 506B. The sounding feedback tone ranking circuit 506A ranks the sounding feedback for each of the OFDM tones used for sounding antenna combinations/subsets. Ranking may be based on any one or all of: received signal strength indicator (RSSI), received power, signal-to-noise ratio (SNR) or channel rank for example. A highest ranked tone and tone index across all groups of tones involved in the antenna sounding is determined. The tone-to-beamform antenna subset/combination correlation circuit 506B correlates the highest ranked tone, e.g. the $5^{th}$ tone in each group, across all groups of tones, with the subset of the Massive MIMO antennas with which it is associated using the antenna test tone records 512 in storage.

The transmit chain expander circuit switch controller 508 switches the transmit chains through the integrated chain combiner and center frequency shifter circuits 254, 260 during antenna sounding. Conversely, once a distinct subset of antenna has been identified the switch controller couples the each transmit chain to the corresponding one of the antenna in the distinct subset via the power amplifiers 250A-B for example. In this latter switch configuration, an added "normal" channel sounding may be required on the highest ranked subset of antenna to explicitly identify the beamforming matrix for each of the OFDM tones in subsequent transmission of user data packets.

FIG. 6 is a process flow diagram of processes associated with a massive MIMO transceiver's beamform antenna subset selection for each link in accordance with an embodiment of the invention. The first block of processes 600-618 are directed to selecting an optimal subset of antennas for beamformed user data packet transmission. In process 600 the transceiver capabilities in terms of the number "N" of Massive MIMO Antennas and the number "T" of transmit chains are identified. Next, in process 604 the number of distinct beamforming antenna subsets/combinations C(N, T) of the Massive MIMO Array that can be driven with existing transmit chains is calculated as: $C(N, T)=N!/(T! \times (N-T)!)$ In embodiments of the invention which include Massive MIMO antenna arrays such as those shown in FIGS. 4A-4B in which individual antenna are themselves spatially tunable the number of overall antenna subset combinations to test will increase exponentially as $S^T$ where "S" is the number of different spatial directions, e.g. North and South, to which any antenna in the array can be tuned. The number of combinations that are subject to an antenna sounding may be less than the total number of possible combinations, without departing from the scope of the claimed invention. The next process 606 is optional. In process N' of the Massive MIMO Antennas are selected for the sounding, where N'>T and N'<=N. After the combinatorics calculations have been made control is passed to process 608 in which a plurality of the beamforming Antenna subsets/combinations to test in a single explicit sounding is determined. Next in process 610 at least one OFDM test tone for each of the beamforming antenna subsets/combinations is selected for testing in the explicit sounding. The tones may be grouped as shown in FIG. 2A. Then in process 612 linearly independent Antenna Mapping Matrix (AMM) are determined for each beamformed antenna subset/combination test tone where AMM row dimension>T and =to N or N' in the embodiment of the invention where N' antennas are selected for testing. Next in process 614 the designated beamform antenna subset/combination (BFAC) test tones in the OFDM toneset of an explicit sounding are precoded with corresponding LI AMM. This process is said to take place in the frequency domain since it involves the processing of individual tones or sub-channels each of which has a distinct center frequency. Then in process 616 all of the OFDM tones of the explicit sounding are transformed from the frequency to the time domain in by the IDFT component in each transmit chain.

Next, a block 618 of sub-processes 618A-C is conducted in the time domain, the collective effect of which is to expand the T physical transmit chains into N virtual chains matching in number the number of antenna under test. In process 618A the explicit sounding signal on all physical transmit chains are combined into "N" distinct combination, one for each of the N antenna under test. Then in process 618B the transmit chains are switchably coupled to all of the MIMO Antennas under test, e.g. N or N' antenna. Then in process 618C each explicit sounding combination is transmitted on a corresponding one of the N or N' antennas at a distinct center frequency relative to each of the other antenna. Control is then passed to the next block of processes, for sounding feedback processing.

In process 630 the sounding feedback for each transmitted tone in the antenna sounding contains channel state information on each received sounding tone including at least one of: a channel matrix "H", a beamforming matrix "V", and a Signal-to-Noise Ratio (SNR) matrix. From these the rank of each of the BFAC Test tones across all groups of tones within the sounding toneset may be determined. Ranking may be based any one or all of: RSSI, SNR, channel rank, received power as determined from the sounding feedback. Next in process 632 the subset of T of the N antennas under test associated with highest ranked BFAC test tone, is identified.

Control is then passed to decision process 634 in which it is determined if more beamformed antenna subsets need to be sounded. If so control returns to process 608 for further antenna subset soundings. If not control passes to process 636. In decision process 636 a determination is made as to whether the groups of tones used for the antenna soundings are sufficiently small so that the highest ranked tone and the associated channel state information can be used to determine the beamforming matrices for the lower ranked, a.k.a. gap tones. If so, then no more soundings are necessary and control passes to the user data transmission block of processes 640-642. Alternately, if a traditional/normal channel sounding is required then control is passed to process 638. In process 638 an explicit channel sounding is transmitted on the highest ranked subset of the antennas to determine from the resultant sounding feedback the beamforming matrix to be used for subsequent user data packet transmission. Control is then also passed to the block of data transmission processes 640-642.

In data transmission process 640 each transmit chain is switchably coupled to a corresponding one of the "T" antennas of the identified subset of antennas. Then in process 642 the MPDU or MSDU Data Communication Packets are transmitted on the Identified Subset of Antenna, spatially Mapped across all OFDM tones with SMM and with the same center Frequency for all Antenna.

The aforesaid processes repeat themselves intermittently as channel conditions change in order to maintain the efficiency of the WLAN communications. Regular channel soundings may be conducted with greater frequency.

EXAMPLES

Antenna Selection with Beamforming Antenna selection is performed when the number of physical antennas exceeds the number of transmit or receive chains. In that case, a decision needs to be made about which antennas to connect to the physical transmit or receive paths. In an environment with rich scattering, the selection of the right set of antennas based for example on location and antenna properties is critical to achieve optimal performance. The available antennas may be of different types. One type can be omni-directional, a.k.a. isotropic. The other type can have a specific spatial pattern, a.k.a. anisotropic. Digital beamforming can be applied in conjunction with these types of antennas.

In this invention, a subset of antennas will be selected based on receiver feedback indicating expected performance with beamforming. The receiver will determine its feedback based on reception of a specially designed training signal that allows concurrent estimation of the performance of multiple possible antenna selections. This is achieved by using separate OFDM tones to test different antenna selections.

In an embodiment of the invention the selection will require some form of feedback from the receiver side to establish which transmit antennas result in the highest signal at the respective receive antennas. In a system with eight antennas, but only four active transmit paths, a different set of four antennas can be selected for different transmissions. Ideally, the selection will be done intelligently to optimize performance. The antennas could be identical omni-directional antennas. Alternatively, the antennas may each have different spatial coverage resulting in different antennas having different radiation patterns.

When there are multiple transmit antennas, the problem becomes how to select a subset of the antennas that results in the best signal at the intended receiver. It may be possible to establish the performance of each transmit antenna to the receive antenna(s) individually but this type of evaluation results in sub-optimal antenna selection when transmission is combined with beamforming. When multi-antenna beamforming is utilized for transmission, the antennas work in coordinated fashion and the best performing beamforming subset of antennas, may not include any of the antenna which exhibit the best performance individually. A beamforming precoding matrix that provides good gain with one subset of antennas will not be optimal for a different antenna subset. The optimal beamforming matrix is specific to the selected subset.

Where a wireless transceiver has 4 transmit chains that can be coupled to an optimal subset of 8 antennas there are 70 possible beamforming combinations to test. For each of the four antenna subsets of the eight antennas we apply beamforming to it. The resulting receive power with the calculated beamforming then provides a measure of the strength of the received signal. The received signal strength can vary greatly depending on which four antennas are selected. It is also interesting to observe that in a representative grid layout of the antenna in a 1×8 Gaussian channel, the worst antennas combination, e.g. antennas [4 5 7 8], is the complement of the best antenna combination, e.g. antennas [1 2 3 6] with the two differing by a factor of five in terms of RSSI.

Antenna selection with beamforming raises a number of specific issues: a) Antennas needs to be evaluated in groups b) Combining performance of individual antennas can not be used to determine optimal beamforming antennas, and c) a large number of such antenna subset combinations has to be evaluated, e.g. selecting four antennas for beamforming out of eight possible antennas requires the evaluation of 70 possible sets of antennas)

A standard mechanism to receive beamforming feedback is through the exchange of sounding frames and sounding responses. Conceptually, each antenna selection will require its own sounding information. From the sounding feedback, the strength of the received signal can be derived. Doing a separate sounding for each antenna combination is not practical, as it requires way too much overhead for the successive soundings of each combination.

It should be noted however that we do not need detailed per-tone channel information. A rough estimate of the received signal strength for various antenna selections is sufficient. Ideally, this estimate should still span the entire frequency range to account for possible fading in parts of the spectrum. However, the granularity can be much coarser than what is needed for actual beamforming. A possible approach to getting such feedback is to combine multiple "candidate" antenna subset selections into a single sounding frame. In OFDM, each tone can in principle use a separate spatial mapping matrix. This permits the use of different spatial mapping matrices for different tones. For the first tone, four transmit chains could be mapped to one choice of four (out of e.g. eight) transmit antennas. For the next tone, the four transmit chains could be mapped to a different set of four antennas, and so on. Of course, for each antenna selection, we'll only receive feedback on a limited number of tones. In practice, the number of different selections will be limited by the desire to repeat each spatial mapping matrix at least a couple of times in the available spectrum width of the selected communication channel(s). In practice, there may be no need to cover all 70 combinations (for the case of four transmit chains and eight antennas). A subset most likely will provide us with a representative sample of the selections. Also, it may be possible to cut the number of antenna sections in half by not explicitly evaluation "complimentary pairs" (such as [4 5 7 8] and [1 2 3 6]). The complement of the worst selection may be a good candidate for the best selection.

In an embodiment of the invention, a first combined sounding feedback serves to guide the antenna selection. Once a selection is established, a dedicated channel sounding across all tones may be required for the highest ranked subset of antenna to find a higher-accuracy beamforming matrix for each tone. In another embodiment of the invention in which the beamforming combinations are more limited, a dedicated channel sounding may not be necessary, if the tone spacing between the tones sounding the optimal beamforming subset of antenna is sufficiently small, the channel or beamforming matrix in the sounding feedback may be interpolated across the gap tones.

In an embodiment of the invention, the beamforming antenna subset evaluation, can be repeated over time. Typically, the first type of, i.e. the combined antenna subsets and channel sounding (combined) needs to be performed less frequently than the "regular" channel sounding. The main challenge to achieving this in practice is that the relationship between transmit chains and transmit antennas is different for a system with antenna selection. In this case, there is no one-to-one mapping between chains and antennas. By design, the spatial mapping defined in MIMO systems like IEEE 802.11n and IEEE 802.11ac takes streams as input and maps its output to the transmit chains. In the case of antenna selection, the transmit chains are mapped to a subset of transmit antennas using the feedback from a single training sequence. This latter form of mapping happens in the time-domain since outputs of the transmit chains are time-domain signals. As such, it is not conducive to frequency-dependent mapping. In practice, these connections are performed using simple relays.

This embodiment of the invention includes a combined spatial mapping in the frequency domain and antenna selection mapping in the time domain that effectively achieves frequency-dependent mapping at the antennas. The antenna selection mapping part of this should remain as simple as possible because of the way it is implemented in practice in the time-domain.

In this case of four antennas and two transmit chains, we'd like to map the two transmit chains to the four antennas, but in such a way that the mapping is different for different tones. Conceptually, this can be written as:

$$Ant_j(n) = \sum_{k=0}^{N-1} Q_{ji}^{(k)} X_i(k) e^{j\frac{2\pi kn}{N}} \quad (1)$$

Where:

$Ant_j(n)$ is the output of antenna j (j=1, . . . , 4)

$Q_{ji}^{(k)}$ is the tone-dependent 4×2 spatial mapping matrix $X_i(k)$ is the training signal of streams i=1,2 on tone k While this is conceptually what we want to achieve, it can not be done directly as with traditional spatial mapping between streams and transmit chains. The goal is to transform (1) to a form that needs no more than two transmit chains and that connects the output of these two transmit chains to the four antennas using blocks that can be easily implemented in the time-domain.

For the case under consideration (two transmit chains vs. four antennas), there are six possible ways to map transmit chains to antennas, namely:

$$\begin{bmatrix} 1 \\ 2 \\ \times \\ \times \end{bmatrix}, \begin{bmatrix} 1 \\ \times \\ 2 \\ \times \end{bmatrix}, \begin{bmatrix} 1 \\ \times \\ \times \\ 2 \end{bmatrix}, \begin{bmatrix} \times \\ 1 \\ 2 \\ \times \end{bmatrix}, \begin{bmatrix} \times \\ 1 \\ \times \\ 2 \end{bmatrix}, \begin{bmatrix} \times \\ \times \\ 1 \\ 2 \end{bmatrix}$$

If we want to cover all these mappings in our sounding frame, we need six different spatial mapping matrices. We'll distribute them equally throughout the spectrum, such that:

$$Q_{ji}^{(6k+m)} = Q_{ji}^{(m)} \quad (2)$$

i.e.: the matrices repeat every six tones.

With this, we can rewrite (1) as:

$$Ant_j(n) = \sum_{m=0}^{5} \sum_{k=0}^{N/6-1} Q_{ji}^{(6k+m)} X_i(6k+m) e^{j\frac{2\pi(6k+m)n}{N}} \quad (3)$$

This still doesn't achieve the desired form. As a next step, let's design the training signal such that $X_i(6k+m)=X_i(6k)$, i.e. six consecutive tones have the same training constellation point.

With these both assumptions, (3) can be written as:

$$Ant_j(n) = \underbrace{\left(\sum_{m=0}^{5} Q_{ji}^{(m)} e^{j\frac{2\pi mn}{N}}\right)}_{M_{ji}} \underbrace{\left(\sum_{k=0}^{N/6-1} X_i(6k) e^{j\frac{2\pi 6kn}{N}}\right)}_{S_i} \quad (4)$$

(4) shows the expression in discrete time. In continuous time, the expression would be:

$$Ant_j(t) = \underbrace{\left(\sum_{m=0}^{5} Q_{ji}^{(m)} e^{j2\pi m \Delta f t}\right)}_{M_{ji}} \underbrace{\left(\sum_{k=0}^{N/6-1} X_i(6k) e^{j2\pi 6k \Delta f t}\right)}_{S_i} \quad (5)$$

Analyzing (4) or (5), we see that the desired (but un-implementable) signal (1) has been transformed into a linear combination of two time-domain signals $S_i$. These two time-domain signals are mapped to the four antennas using a new mapping matrix $M_{ji}$, which depends on a linear combination of all frequency-dependent mapping matrices and also exhibits time-dependency.

The signals $S_i$ can be generated using the two transmit chains that we have available. In the more general case, the number of signals $S_i$ will correspond to the number of available transmit chains. The main question is now how to efficiently implement the antenna mapping in the time domain (the matrix $M_{ji}$). To simplify the implementation, we begin by making a convenient choice of mapping matrices as follows:

$$Q^{(0)} = \begin{bmatrix} 1 & j \\ 1 & -j \\ 0 & 0 \\ 0 & 0 \end{bmatrix}, Q^{(1)} = \begin{bmatrix} 1 & j \\ 0 & 0 \\ 1 & -1 \\ 0 & 0 \end{bmatrix}, Q^{(2)} = \begin{bmatrix} 1 & j \\ 0 & 0 \\ 0 & 0 \\ 1 & 1 \end{bmatrix},$$

$$Q^{(3)} = \begin{bmatrix} 0 & 0 \\ 1 & -j \\ 1 & -1 \\ 0 & 0 \end{bmatrix}, Q^{(4)} = \begin{bmatrix} 0 & 0 \\ 1 & -j \\ 0 & 0 \\ 1 & 1 \end{bmatrix}, Q^{(5)} = \begin{bmatrix} 0 & 0 \\ 0 & 0 \\ 1 & -1 \\ 1 & 1 \end{bmatrix},$$

What makes these matrices convenient is that any element is either 0 or identical for all of the matrices. For instance $Q_{11}^{(m)}$ is either 1 or 0 for all m, $Q_{12}^{(m)}$ is either j or 0 for all m. This will simplify the sum over m in (4).

With this choice of matrices, we have:

$$M_{ji} = \begin{bmatrix} 1 + e^{j\frac{2\pi n}{N}} + e^{j\frac{2\pi 2n}{N}} & & & \\ & 1 + e^{j\frac{2\pi 3n}{N}} + e^{j\frac{2\pi 4n}{N}} & & \\ & & e^{j\frac{2\pi n}{N}} + e^{j\frac{2\pi 3n}{N}} + e^{j\frac{2\pi 5n}{N}} & \\ & & & e^{j\frac{2\pi 2n}{N}} + e^{j\frac{2\pi 4n}{N}} + e^{j\frac{2\pi 5n}{N}} \end{bmatrix} \begin{bmatrix} 1 & j \\ 1 & -j \\ 1 & -1 \\ 1 & 1 \end{bmatrix}$$

The first step in the antenna mapping is a fixed 4×2 mapping matrix:

$$\begin{bmatrix} 1 & j \\ 1 & -j \\ 1 & -1 \\ 1 & 1 \end{bmatrix} \begin{bmatrix} S_1 \\ S_2 \end{bmatrix} = \begin{bmatrix} S_1 + jS_2 \\ S_1 - jS_2 \\ S_1 - S_2 \\ S_1 + S_2 \end{bmatrix}$$

The intermediate output of this step is a set of four simple linear combinations of the $S_i$. The only required operations are additions and phase rotations of multiple of 90 degrees. All of these operations can be executed very simply in the time domain.

The second step is a multiplication of each of the four intermediate outputs with a sum of sinusoids. This too is something that can be implemented directly in the time-domain. A possible implementation of this is illustrated in FIG. 3A. The connections between transmit chains and transmit antennas shown in FIG. 3A are more complex than what would be needed for straightforward antenna-selection. However, all involved operations can be performed in the time-domain and we get the benefit that multiple possible antennas selections can be sounded with a single sounding frame.

Note that the connections could be done in either analog or digital domain. The output of the "baseband" block could be analog signals (as in equation (5)), in which case the connections and multiplications are performed by analog blocks. Alternatively, the outputs, combining and multiplications could be done in digital (as in equation (4)), with the final signals then being fed into a discrete set of ADCs.

Process flow for Beamforming Antenna Subset Selection: To determine the best antenna set in combination with beamforming, we'll essentially go through the following steps: a) Determine set of Spatial Mapping Matrices corresponding to the number of transmit chains and the number of transmit antennas; b) Configure the chains-to-antenna mapping to achieve frequency-dependent mapping; c) transmit frequency-dependent sounding for the selected set of spatial mapping matrices thereby combining different possible beamform antenna selections in a single sounding; d) Identify an optimal selection based on the tone-dependent sounding feedback to the sounding frame; e) select the best beamform antenna subset selection based on received feedback; f) Perform "regular" sounding using the highest ranked antenna subset selection as at antenna selection.

This embodiment of the invention selects a subset of antennas to connect to a smaller number of transmit chains. The selection is based on receiver feedback in response to a training signal that is designed to use separate OFDM tones to test different antenna selections. This allows for concurrent estimation of the performance of multiple possible antenna selections.

In other embodiments of the invention the aggregated beamforming antenna subset sounding in the frequency domain described and discussed above, may be applied with equal advantage to WAPs or stations with any number of transmit chains and any number of massive MIMO antenna, including but not limited to: 1×2 . . . 1×n, 2×3, 2×4 . . . 2×n, 3×4, 3×n, 4>5 . . . 4×8 . . . 4×n, . . . 8×9, . . . 8×16 . . . 8×n; without departing from the scope of the Claimed invention.

The components and processes disclosed herein may be implemented in a combination of software, circuits, hardware, and firmware, integrated with the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus, comprising:
a plurality of components coupled to one another to form at least one receive and transmit chain for multiple-input multiple-output (MIMO) wireless communications on orthogonal frequency division multiplexed (OFDM);
a beamform antenna selection circuit coupled to the at least one receive and transmit chain, the beamform antenna selection circuit to:
identify a first number of antennas to test;
identify a second number of receive and transmit chains that are available to couple to the antennas, wherein the first number of antennas to test is greater than the second number of receive and transmit chains;
determine a third number of possible combinations that the receive and transmit chains may couple to the antennas;
generate a set of antenna mapping matrices, the number of antenna mapping matrices in the set of antenna mapping matrices being equal to the third number of possible combinations, wherein each antenna mapping matrix identifies a number of antenna that is greater than a number of transmit chains;
generate, based on the set of antenna mapping matrices, a multi-tone sounding signal to test the possible combinations;
receive sounding feedback;
determine a performance for each of the possible combinations based on the sounding feedback, wherein a particular combination has a highest ranked performance; and
switchably couple the at least one receive and transmit chain to an antenna that is associated with the particular combination with the highest ranked performance for transmission of subsequent data communication packets; and
a center frequency shifter circuit to:
vary a center frequency of the multi-tone sounding signal for the sounding; and
set a frequency for the particular combination with the highest ranked performance.

2. The apparatus of claim 1, wherein the multi-tone sounding signal includes a sounding frame that includes a different tone for each of the possible combinations.

3. The apparatus of claim 1, further comprising a chain combiner circuit to:
accept input from the at least one receive and transmit chain; and
generate a fourth number of outputs, the fourth number being equal to the first number, the outputs pertaining to the possible combinations.

4. The apparatus of claim 3, wherein the set of antenna mapping matrices and the outputs are generated in a time domain.

5. The apparatus of claim 3, the chain combiner circuit further to rotate a phase of a transmit chain.

6. The apparatus of claim 1, wherein the performance for each of the possible combinations is determined based on at least one of a Received Signal Strength Indicia (RSSI), a signal-to-noise (SNR) ratio, or a channel rank.

7. The apparatus of claim 1, wherein the sounding feedback includes channel state information (CSI) sounding feedback, wherein apparatus is to use the CSI sounding feedback for beamforming during subsequent transmission of one or more data packets.

8. The apparatus of claim 1, wherein the multi-tone sounding signal to test the possible combinations is varied to have a distinct center frequency for each combination of the possible combinations.

9. The apparatus of claim 1, wherein the multi-tone sounding signal is varied to have a distinct center frequency for each of the antennas to test.

10. The apparatus of claim 1, wherein the beamform antenna selection circuit is to switchably couple the at least one receive and transmit chain to an antenna after the center frequency shifter circuit varies the center frequency of the multi-tone sounding signal for the sounding.

11. The apparatus of claim 1, wherein the possible combinations includes a first antenna and a second antenna.

12. The apparatus of claim 11, wherein the multi-tone sounding signal to test the possible combinations is associated with a particular center frequency, wherein the center frequency is used for sounding of the first antenna and the second antenna.

13. The apparatus of claim 1, wherein the particular combination that has a highest ranked performance includes at least two antenna that were both sounded at a particular center frequency.

14. The apparatus of claim 1, wherein the multi-tone sounding signal is varied to have a distinct center frequency for at least some of the antennas to test, wherein at least two antennas are tested at a same center frequency.

15. A method, comprising:
identifying a first number of antennas to test;
identifying a second number of receive and transmit chains that are available to couple to the antennas, wherein the first number of antennas to test is greater than the second number of receive and transmit chains;
determining a third number of possible combinations that the receive and transmit chains may couple to the antennas;
generating a set of antenna mapping matrices, the number of antenna mapping matrices in the set of antenna mapping matrices being equal to the third number of possible combinations, each antenna mapping matrix in the set of antenna mapping matrices having a number of rows equal to a number of antennas, wherein the antenna mapping matrix identifies a number of antenna that is greater than a number of transmit chains;
generating, based on the set of antenna mapping matrices, a multi-tone sounding signal to test the possible combinations;
receiving sounding feedback;
determining a performance for each of the possible combinations based on the sounding feedback, wherein a particular combination has a highest ranked performance;
switchably coupling the at least one receive and transmit chain to an antenna that is associated with the particular combination with the highest ranked performance for transmission of subsequent data communication packets;
varying a center frequency of the multi-tone sounding signal for the sounding; and
setting a frequency for the particular combination with the highest ranked performance.

16. The method of claim 15, wherein the multi-tone sounding signal includes a sounding frame that includes a different tone for each of the possible combinations.

17. The method of claim 15, further comprising:
accepting input from the at least one receive and transmit chain; and
generating a fourth number of outputs, the fourth number being equal to the first number, the outputs pertaining to the possible combinations.

18. The method of claim 17, wherein each antenna mapping matrix in the set of antenna mapping matrices has a number of rows equal to a number of antennas.

19. The method of claim 15, wherein the performance for each of the possible combinations is determined based on at least one of a Received Signal Strength Indicia (RSSI), a signal-to-noise (SNR) ratio, or a channel rank.

20. The method of claim 15, wherein the sounding feedback includes channel state information (CSI) sounding feedback, further comprising using the CSI sounding feedback for beamforming during subsequent transmission of one or more data packets.

21. A very large scale integrated (VLSI) circuit to couple between transmit chains of a wireless orthogonal frequency division multiplexed (OFDM) transceiver and an array of antennas greater in number than a number of the transmit chains, and the VLSI circuit comprising:
a beamform antenna selection circuit coupled to the transmit chains, the beamform antenna selection circuit to:
determine a number of possible combinations that the transmit chains may couple to the array of antennas;
generate a set of antenna mapping matrices, the number of antenna mapping matrices in the set of antenna mapping matrices being equal to the number of possible combinations, each antenna mapping matrix in the set of antenna mapping matrices having a number of rows equal to a number of antennas in the array of antennas;
generate, based on the set of antenna mapping matrices, a sounding packet to test the possible combinations;
receive sounding feedback;
determine a performance for each of the possible combinations based on the sounding feedback, wherein a particular combination has a highest ranked performance; and
switchably couple the transmit chain to an antenna of the array of antennas that is associated with the particular combination with the highest ranked performance for transmission of subsequent data communication packets; and
a center frequency shifter circuit to:
vary a center frequency of the multi-tone sounding signal for the sounding; and
set a frequency for the particular combination with the highest ranked performance.

22. The VLSI circuit of claim 21, the sounding packet comprising a multi-tone sounding signal with separate tones applicable to a plurality of distinct subsets of the antennas.

23. The VLSI circuit of claim 22, wherein the multi-tone sounding signal includes a sounding frame that includes a different tone for each of the possible combinations.

24. The VLSI circuit of claim 21, the number of transmit chains includes a number of virtual transmit chains such that the total number of transmit chains, including the virtual transmit chains, to match a number of antennas sounded in the sounding packet.

25. The VLSI circuit of claim 21, wherein the performance for each of the possible combinations is determined based on at least one of a Received Signal Strength Indicia (RSSI), a signal-to-noise (SNR) ratio, or a channel rank.

* * * * *